M. C. SCHWAB.
SWITCH FOR GRAVITY CONVEYERS.
APPLICATION FILED SEPT. 14, 1907.
996,944.
Patented July 4, 1911.
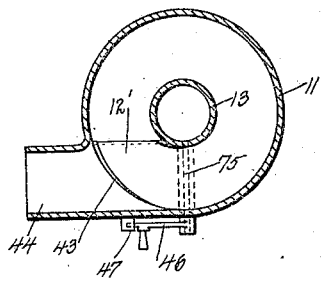
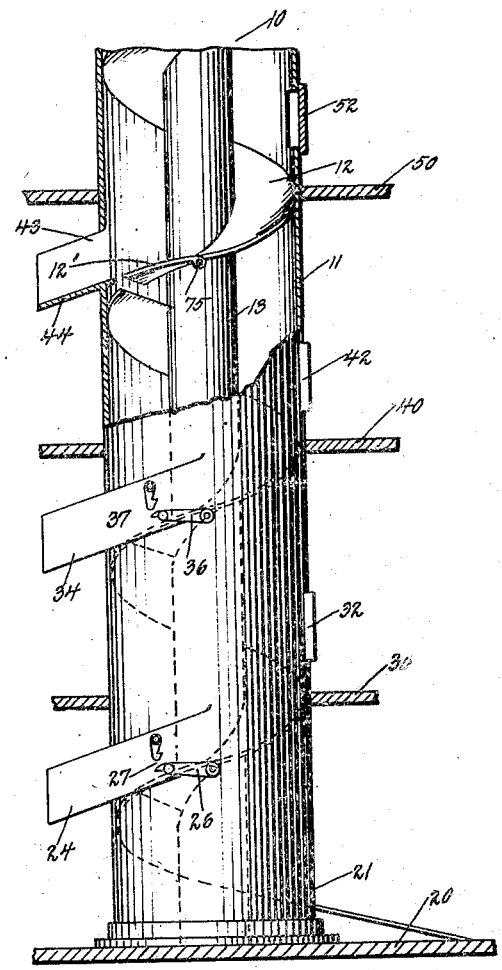
WITNESSES
Ernest L. Gale Jr.
James G. Bethell
INVENTOR
Martin C. Schwab
BY
C. M. Nissen
ATTORNEY

UNITED STATES PATENT OFFICE.

MARTIN C. SCHWAB, OF BALTIMORE, MARYLAND, ASSIGNOR TO GRAVITY CONVEYOR COMPANY, A CORPORATION OF NEW YORK.

SWITCH FOR GRAVITY-CONVEYERS.

996,944.  Specification of Letters Patent.   Patented July 4, 1911.

Application filed September 14, 1907. Serial No. 392,856.

*To all whom it may concern:*

Be it known that I, MARTIN C. SCHWAB, a citizen of the United States, residing in Baltimore, in the State of Maryland, have invented a new and useful Improvement in Switches for Gravity-Conveyers, of which the following is a specification.

My invention relates to gravity conveyers or chutes and comprises features disclosed in my co-pending application, Serial No. 242,406, filed January 23, 1905, Patent No. 868,020, dated October 15, 1907, for an improvement in package conveyers.

One of the objects of my invention is the provision of a movable section of a spiral blade of a gravity conveyer arranged to be deflected into position to deflect articles from their normal path of movement.

Other objects of the invention will appear hereinafter, the novel combinations of elements being set forth in the appended claims.

In the accompanying drawing like characters of reference designate similar parts.

Figure 1 is an elevational view of a spiral gravity conveyer including my invention; and Fig. 2 is a fragmentary plan sectional view of Fig. 1 taken on a plane above one of the deflecting sections of Fig. 1.

Referring to the drawings, 10 designates in general a spiral chute or a spiral gravity conveyer comprising an outer shell 11, an inner core or tube 13, and an interposed helical blade 12 or a conveying surface arranged in convolutions. 20, 30, 40 and 50 designate the various floors or landings connected by this conveyer. At the floor 20 is an out-take opening 21, and at the floors 30, 40 and 50, respectively, are the in-take openings, each provided with a door 32, 42 and 52. Through these intake openings, after the doors are opened, the articles may be placed on the conveyer to permit them to descend by gravity to a lower floor or to the basement floor 20. These openings may be varied as desired, and any type of door may be used.

Other openings for discharging packages or articles from the conveyer are provided above the surface of the helical blade at the various floors or at any desired elevations, the uppermost opening being designated by the reference number 43. At or near these out-take openings are connected troughs or auxiliary chutes 24, 34 and 44, respectively, to guide the articles after passing through the out-take openings. The troughs mentioned are preferably attached to the outer shell 11 rigidly and made integral therewith. In some instances, however, the troughs may be removably connected to the conveyer.

In the aforesaid patent are disclosed and claimed pivoted shelves mounted in position to form a continuation or extension of the troughs into the conveyer in the nature of bridges, these pivoted shelves or bridges being normally lifted above or clear of the spiral or carrying surface of the conveyer so as not to obstruct articles passing downwardly; disclosure is also made therein of an interlocking device with connections to the various bridges to permit the latter to be operated from various floors. It will be evident that such interlocking device and operating mechanism may also be used in connection with the present invention.

Instead of using pivoted shelves, a part of the spiral blade itself may be made movable, such part or section being designated by the reference number 12' and is pivoted at 75 between the core 13 and shell 11, or to the portion of the blade 12 immediately above the same. Ordinarily the section, bridge or shelf 12'. rests upon the surface of the spiral blade 12 by extending partly over the same as indicated in Fig. 1, so that the usual operation of the conveyer is not interfered with when the said section is in its lowermost position. Connected rigidly with the sections are the arms 26, 36 and 46, such that when the latter are moved either by connecting rods or handles attached thereto the positions of the sections may be shifted.

It will be noticed that the out-take openings and the troughs adjacent the same are so arranged that the articles cannot be thrown therethrough by centrifugal force while descending. When a section 12', however, is lifted to a position to form substantially a continuation of the spiral blade and the trough, the articles will be deflected by such section through an out-take opening and guided by the trough in the proper direction. It should be noted also that the spiral sections of the conveying surface form substantial continuations of each other the junctions of said sections being located adjacent the respective openings 43 in the outer shell or wall 11. Obviously the switches or deflecting devices 12' may be moved upwardly from such a position as shown between floors 40 and 50 in Fig. 1 so as to actually stop descending articles, particularly if it is desired to use opening 43 as an intake opening as well as an outtake opening; however, the principal function of the deflector 12' is to stop the articles from descending farther along the conveying surface by leading them out of the conveyer. As indicated in Fig. 2 a portion of the stop 12' overhangs a section of the blade beneath the same and when in non-deflecting position rests on the lower section. Whether in conveying position or in deflecting position the upper end of the stop 12' does not extend above the level of the surface of the upper section of the blade 12. In fact, by reason of the pivotal connection 75, the surfaces of the upper section 12 and the switch 12' are substantially continuous and no obstruction is produced by the switch 12' when the latter is let down on the lower section of the blade 12. Nor is the continuity of the smooth surface of the upper section interfered with when the stop or deflector 12' is shifted by means of the lever 46 to the position where the articles will be led off the conveyer.

If the interlocking mechanism is used in connection with this improvement, only one section could be operated at a time and must be replaced to normal position before a section at another floor could be operated. If, however, the interlocking mechanism is omitted as shown in the drawings, then one or more of the sections may be operated such that articles placed into the conveyer at an upper floor will be ejected through an outtake opening at the floor immediately below, or at such a lower floor where the position of the deflecting shelf has been shifted. If desired latch devices 27, 37, 47 may be employed to hold the shelves in lifted position.

Obviously those skilled in the art may make various changes in the details and arrangement of parts without departing from the spirit and scope of my invention, and I desire therefore not to be limited to the precise construction herein disclosed.

Having thus described my invention, what I claim and desire to have protected by Letters Patent of the United States is:—

1. The combination of a conveyer having a spiral conveying surface, an inclosing casing, and means movable about a horizontal pivot and constituting a part of such surface for switching articles off the said conveyer surface.

2. The combination of an inclosed conveyer having a spiral conveying surface, a device forming a part of said conveyer for leading articles off the same and adapted to be swung about a horizontal pivot into and out of operative position.

3. The combination with an inclosed conveyer having a spiral conveying surface, and a device forming part of said surface and movable to a position to deflect articles from the conveyer.

4. The combination with a gravity conveyer having an inclosed spiral conveying surface, of a pivoted device normally constituting a part of the conveyer, and means for moving said device to ejecting position.

5. The combination of a conveyer having a spiral conveying surface extending above and below an opening in the conveyer, and movable means constituting a part of such surface for connecting the opening in said conveyer with the conveying surface.

6. The combination with a conveyer having a spiral conveying surface extending above and below an opening in the conveyer, of a device normally constituting a part of such conveying surface, and means for shifting the position of said device to connect an opening in said conveyer with the conveying surface.

7. The combination with a gravity conveyer having a spiral conveying surface, of a pivoted bridge normally constituting a part of said conveying surface, and means outside of the conveyer for moving said bridge to connect the surface above the same with an exit opening.

8. The combination with a gravity conveyer having a spiral conveying surface, of a plurality of bridges each composing a portion of such surface, and means outside of the conveyer for moving said bridges to connect the surface above the same with exit openings.

9. The combination with a gravity conveyer having a spiral conveying surface extending above and below openings in the conveyer, of a plurality of bridges pivotally connected to the conveyer and each normally composing a portion of such conveying surface, and appliances for moving said bridges independently of each other to connect or disconnect the conveying surface above the bridges with said openings.

10. The combination with a gravity conveyer having a spiral conveying surface extending above and below an opening in the conveyer, of a pivoted bridge or section normally constituting a portion of such surface, and means for lifting said section into a position to deflect descending articles through said opening.

11. The combination with a gravity conveyer having a helical conveying surface extending above and below openings in the conveyer, of a plurality of movable sections each normally constituting portions of such spiral conveying surface, and individual devices for operating said sections to connect or disconnect the conveying surface above the same with the said openings.

12. The combination with a conveyer having a helical conveying surface, of a plurality of troughs at different elevations adjacent openings in said conveyer, a plurality of bridges or sections, one connected at or near each of said openings and each normally composing a portion of such conveying surface, and individual appliances for moving said bridges or sections to connect or disconnect the troughs with the conveying surface immediately above said sections.

13. The combination with a post, of a helical blade surrounding said post, said blade comprising a movable section arranged to be moved to form a break in the way formed by said blade, an outer shell inclosing said blade and post, and means for guiding the articles from said section and discharging the same outside the helical way from a place above said break.

14. A spiral conveyer comprising a post, means secured thereto and forming a spiral way around the same, said means comprising a hinged section arranged to be turned pivotally into position to form a part of the spiral way or turned up pivotally to break the continuity of the spiral, and means arranged to lead articles off tangentially from the said section of the spiral when the same is adjusted into its last-named position.

15. A spiral conveyer comprising a post, and means secured thereto for forming a spiral way around the same, said means comprising a movable section arranged to be moved to form a break in said way or to form an outwardly extending switch section for leading the articles across said break and discharging the same outside the spiral way from a place above the bottom of said way, said switch section being secured at one end to the unbroken part of said way and spanning the break therein when adjusted into its last-named position.

16. A spiral conveyer comprising a post, and means secured thereto for forming a spiral way around the same, said means comprising a hinged section arranged to be turned pivotally into position to form part of the spiral way or turned up pivotally to break the continuity of the spiral and to form a switch section arranged to lead articles off tangentially from the broken part of the spiral when said hinged section is adjusted into its last-named position.

17. The combination of a conveyer comprising an outer shell, an inner core and an interposed helical blade, said blade including a section spanning a break in the blade and normally in alinement with the upper portion of the blade, and a device for moving said section from its normal position of continuity to a predetermined position to deflect articles from the blade through an exit opening.

18. The combination with a gravity conveyer comprising an outer shell, an inner core and an interposed helical blade having pivoted sections, of guiding troughs at openings in the conveyer above said blade, and individual devices extending outside the outer shell for moving said sections from their positions of continuity to a predetermined position to deflect descending articles through said openings into said troughs.

19. The combination with a wall having an opening, of two spiral sections therein, one forming a substantial continuation of the other, the junction of said sections being located adjacent to said opening, and a shiftable stop, interposed between said sections and having a portion which overhangs the lower section and does not extend above the level of the surface of said upper section.

In testimony whereof, I have signed my name to this specification in the presence of two subscribing witnesses.

MARTIN C. SCHWAB.

Witnesses:
CARL P. SCHROEDER,
GUST. F. JEOLLICKER.